Patented Apr. 12, 1927.

1,624,195

UNITED STATES PATENT OFFICE.

UTLEY WEDGE, OF ARDMORE, PENNSYLVANIA, ASSIGNOR TO I. P. THOMAS & SON COMPANY, OF CAMDEN, NEW JERSEY, A CORPORATION OF NEW JERSEY.

METHOD OF PRODUCING PHOSPHATE FERTILIZER.

No Drawing. Application filed February 7, 1923. Serial No. 617,602.

My invention relates to the treatment of phosphate rock to produce a product suitable for use as or manufacture into a fertilizer and preferably to a treatment which will produce a fertilizer having soluble salts both of phosphorus and potassium.

The object of my invention is to produce from phosphate rock a fertilizer material in which substantially all its phosphoric acid contents is converted into water-soluble or citrate-soluble phosphates and which material is friable and easily ground to a suitable fineness for use. A further object is to do this by a furnace treatment economical in its heat requirements and yielding the maximum product for the time of furnace treatment required. These objects I have discovered can be secured by making a dry mixture of phosphate rock with potassium chloride and sodium chloride charging the mixture into a furnace and heating it to a temperature at which the reaction takes place and carbon dioxide is liberated. I have found that phosphate rock finely ground and mixed with sodium carbonate in proper proportion, for instance 50 parts finely ground rock with 17 parts sodium carbonate about 10 parts potassium chloride, when heated to a temperature of 1300° C. for one hour will contain about 99% of its phosphoric acid contents as soluble $P_2O_5$ and that practically all of the carbon dioxide is driven off. I have also found that similar results are secured by heating the mixture to 1100° C. for two and one half hours. For example, this result is secured if a temperature of 1100° C. is maintained at the discharged end of a kiln furnace of the cement kiln type while the time of treatment mentioned is that of the passage of the mixture through the furnace.

The reaction can be carried to completion at lower temperature and longer period of treatment but a treatment for example, at 900° C. would require a longer period of treatment which would be economically objectionable.

My use of potassium chloride is for the purpose of providing water soluble potash salts in the product and also for the purpose of utilizing this chloride as a reagent for making soluble the phosphoric acid contents of the phosphate rock and I use the sodium carbonate in quantity sufficient to react with the percentage of tricalcium phosphate which is not acted upon by the potassium chloride, and by this means a practically complete conversion to soluble phosphates is attained with economy of material, heat and time of treatment and with avoidance of the tendency of the material to adhere to the furnace walls or to form hard clinker-like masses in the product.

In all cases I find it advisable to use a temperature and time of treating which will result in the elimination of the carbon dioxide which avoids the tendency to reversionary reaction which exists in all cases and which reversionary tendency, no doubt, prevents the complete reaction when only alkali metal salts are used which do not liberate as a gas at permissible temperatures some component (for example, chlorine) unnecessary in the product, the escape or removal of which prevents the reversionary tendency of the reaction.

My process involving the use of sodium carbonate is also useful where sodium chloride is used because if the temperature and other conditions are such as would otherwise result in the liberation of chlorine, such liberated chlorine combines with the sodium of the alkali metal carbonate forming common salt which is not objectionable in the product and the escape of the chlorine which would be highly objectionable is prevented or materially decreased.

I have pointed out above that the efficiency of my process depends upon the escape of carbon dioxide from the mixture under treatment and it will be understood that enough carbonate must be used to secure a substantially complete conversion of the phosphoric acid constituents of the rock to soluble form. If an excess of sodium carbonate is used it is, for obvious reasons, unnecessary that all its carbon dioxide should be eliminated.

Having now described my invention, what I claim as new and desire to secure by Letters Patent, is:

The method of treating phosphate rock to render its phosphoric acid contents soluble which consists in making a dry mixture of phosphate rock with potassium chloride and sodium carbonate, charging said dry mixture into a furnace and heating it to a temperature at which the reaction takes place and carbon dioxide is liberated.

UTLEY WEDGE.